US007117323B1

(12) United States Patent
Delaney

(10) Patent No.: US 7,117,323 B1
(45) Date of Patent: Oct. 3, 2006

(54) CYCLIC REDUNDANCY CHECKING FOR MANAGING THE COHERENCY OF MIRRORED STORAGE VOLUMES

(75) Inventor: William P. Delaney, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 766 days.

(21) Appl. No.: 10/057,359

(22) Filed: Oct. 23, 2001

(51) Int. Cl.
  *G06F 12/16* (2006.01)
  *G06F 11/08* (2006.01)
(52) U.S. Cl. .............................. 711/162; 714/6; 714/758
(58) Field of Classification Search .................... 711/4, 711/111–114, 141, 161–162; 707/204; 714/6, 714/11, 758
See application file for complete search history.

(56) References Cited

U.S. PATENT DOCUMENTS

| 5,649,089 | A | * | 7/1997 | Kilner ............................ 714/6 |
| 5,742,792 | A | * | 4/1998 | Yanai et al. ................. 711/162 |
| 5,870,759 | A | * | 2/1999 | Bauer et al. ................. 707/201 |
| 6,480,970 | B1 | * | 11/2002 | DeKoning et al. ............. 714/6 |
| 6,629,198 | B1 | * | 9/2003 | Howard et al. ............. 711/112 |
| 6,725,331 | B1 | * | 4/2004 | Kedem ....................... 711/117 |

OTHER PUBLICATIONS

EMC, "EMC Best Practices: Symmetrix Connect and File Level Granularity," Feb. 2002, pp. 1-28.*

* cited by examiner

*Primary Examiner*—Denise Tran
(74) *Attorney, Agent, or Firm*—Suiter, West, Swantz PC LLO

(57) ABSTRACT

The present invention is directed to a method and system for managing the coherency of mirrored storage volumes, including a method and system for restoring coherency in the event of communication disruption between the primary volume and the secondary volume mirroring the data on the primary volume. The system includes a primary and a secondary storage controllers for managing the primary and secondary storage volumes. The storage controllers are capable of performing cyclic redundancy checking scans of their respective storage volumes and comparing the results to determine data from the primary storage volume needed to update the secondary storage volume so that it mirrors the primary storage volume.

29 Claims, 4 Drawing Sheets

CYCLIC REDUNDANCY CHECKING FOR MANAGING THE COHERENCY OF MIRRORED STORAGE VOLUMES

FIELD OF THE INVENTION

The present invention generally relates to the field of mirrored data storage and particularly to a protocol and controller suitable for controlling the coherency of mirrored data storage volumes.

BACKGROUND OF THE INVENTION

Currently, information handling systems are often integrated into groups with multiple users accessing and storing data. For various reasons, groups of information handling system users may be located in separate areas such as in different offices, or in different geographic locations. Even with multiple users located in separate locations the need may arise to generate a unified data storage system. For example a common database of information may be desirous, such as a customer database for a business with different geographic locations. As a result, different storage volumes may need to be maintained and integrated to store and manage data.

When common volumes of information are stored a back-up of data may be needed such as by using other data storage volumes mirroring the primary storage volume to protect the data in the case of natural disasters, data corruption or the like. Additionally, the separate user locations may need to continue to function should a disruption in communication occur between the various locations.

Should a disruption in communication occur, the storage volumes may become incoherent, and as a result a secondary, mirroring storage volume may no longer represent the data on the primary storage volume. If the primary and the secondary storage volumes no longer mirror each other the need to reestablish coherency would require the communication of the data stored on the primary volume to the secondary volume. A transmission of the primary volume to the secondary volume is undesirous due to the typically large volume of information and the time required to transmit.

Presently, to avoid the need to communicate the contents of the primary storage volume in the event of a break in communication, a bitmap is typically maintained to track the changes in the primary volume while communication between the primary and the secondary volumes is disrupted. A bitmap is utilized to provide a list of changes occurring to the primary storage volume so that the data written to the primary volume may be updated to the secondary volume when communication is reestablished. Thus, the need to transfer the entire contents of the primary storage volume to the secondary storage volume upon reestablishment of communication is eliminated. Generally, bitmaps of mirrored storage volumes are maintained in non-volatile memory to ensure their protection in the event of a power failure. Additionally, bitmaps are maintained in non-volatile memory because the mirrored storage volume system had no other method for establishing coherency besides transmitting the contents of the primary storage volume to the mirroring storage volume. Thus resulting in an input/output intensive operation.

Therefore, it would be desirable to provide a mirrored storage volume system capable of eliminating the need for a costly, time consuming non-volatilite stored bitmap system and method for ensuring the coherency of mirrored volumes or in the alternative a mirrored volume system in which a bitmap may be maintained in volatile memory.

SUMMARY OF THE INVENTION

Accordingly, the present invention is directed to a mirrored storage volume system and methods for managing a mirrored storage volumes and restoring coherency in mirrored storage volumes. In a first aspect of the present invention a mirrored storage volume system includes a primary storage controller, a secondary storage controller, a primary storage volume, a secondary storage volume and a communication channel linking the primary controller to the secondary controller. The primary and secondary controllers may be capable of conducting cyclic redundancy checking scans on their respective storage volumes. Furthermore, the CRC scans of the primary and secondary storage volumes may be compared to determine differences between the primary and the secondary storage volumes so that the secondary storage volume may be updated with data from the primary storage volume to ensure the secondary storage volume mirrors the primary storage volume.

In a further example a volatile memory may be linked to the primary controller so that if communication between the primary storage controller and the secondary storage controller is interrupted, a coarse grain bitmap may be maintained to update changes occurring on the primary storage volume to the secondary storage volume once communication is reestablished.

In a second aspect of the present invention, a method for restoring coherency in mirrored storage volumes is disclosed. The method includes conducting a CRC scan of a primary and secondary storage volume, transferring the primary storage volume scan result to a secondary storage controller for comparison to the secondary CRC scan. Once the primary and secondary CRC scans have been compared the secondary controller may request data stored in the primary storage volume from the primary storage controller to update any non-matching blocks of information on the secondary storage volume. The primary controller may then transfer the appropriate data to the secondary storage controller to allow for the data to be written to the secondary storage volume.

In a third aspect of the present invention a method for restoring coherency in mirrored storage volumes includes generating a coarse grain bitmap in volatile memory of writing operations occurring on the primary storage volume while communication between the primary and secondary storage volumes is disrupted. Once communications have been reestablished the bitmap may then be utilized to update the secondary storage volume. In the event of a power surge, reset type error or the like causes an error in the bitmap the method may revert to utilizing CRC scans to reestablish coherency.

In a further aspect of the invention a method for managing mirrored storage volumes may include conducting a low priority CRC scan of a primary and secondary storage volumes. Once the CRC scans have been conducted the scan results may be compared such that the difference between data blocks may be determine so that data from the primary volume may be updated to the secondary volume.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the current invention, examples of which are illustrated in the accompanying drawings.

Figure 1:
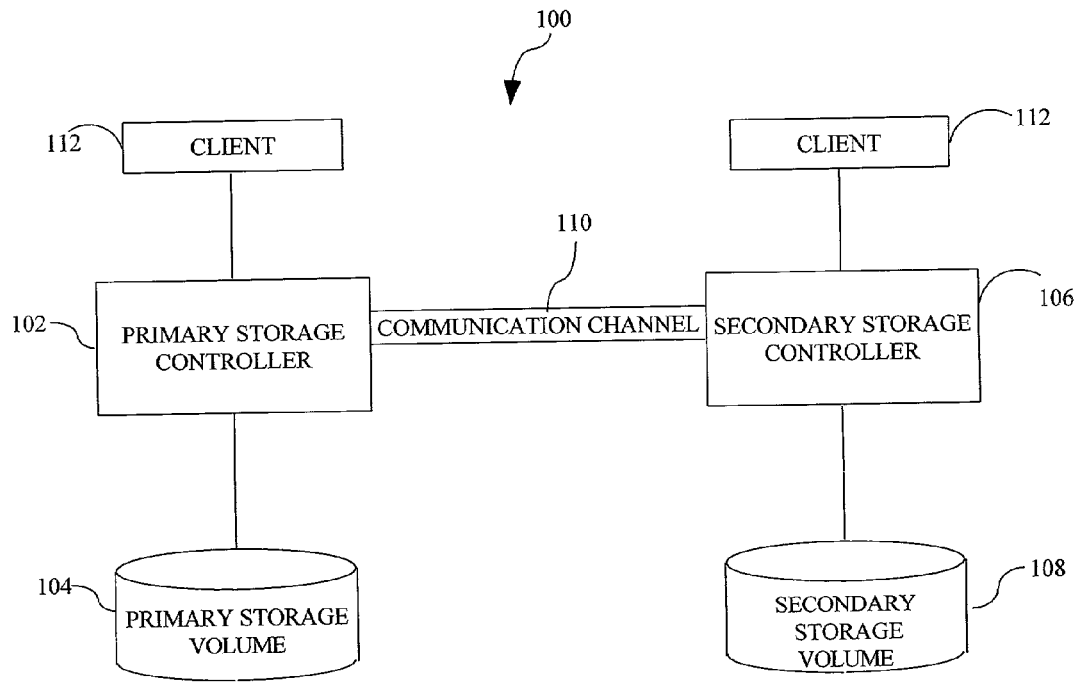
FIG. 1 is an overview illustration of an exemplary embodiment wherein a mirrored storage volume system with cyclic redundancy checking (CRC) capability is shown.
Figure 2:
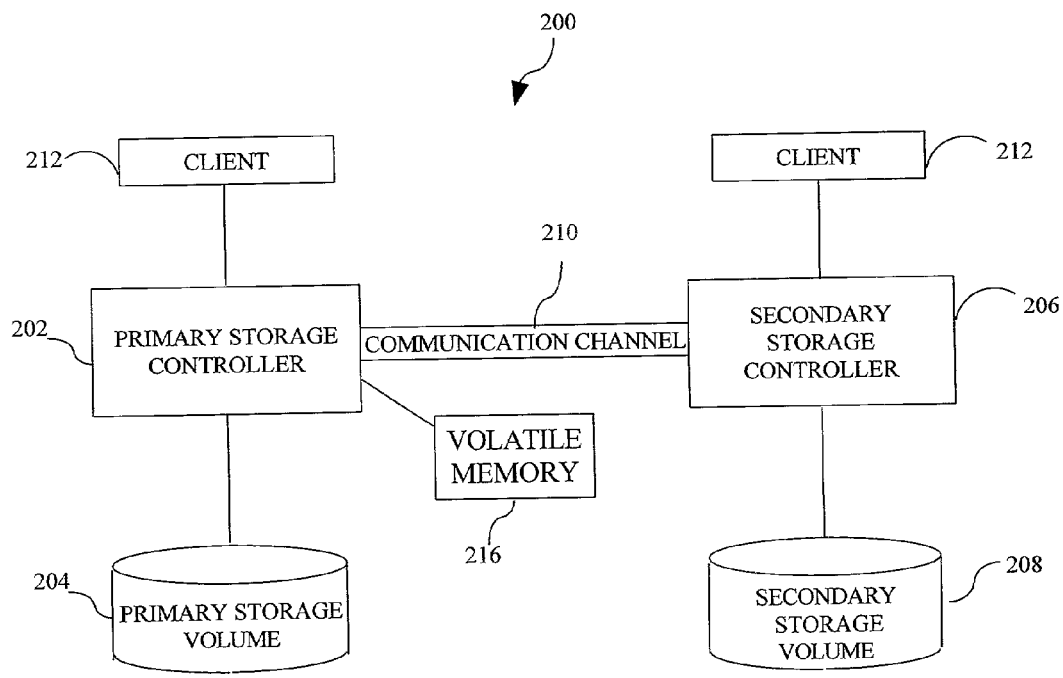
FIG. 2 is an overview illustration of an exemplary embodiment wherein a mirrored storage volume system with CRC capability includes a volatile memory.
Figure 3:
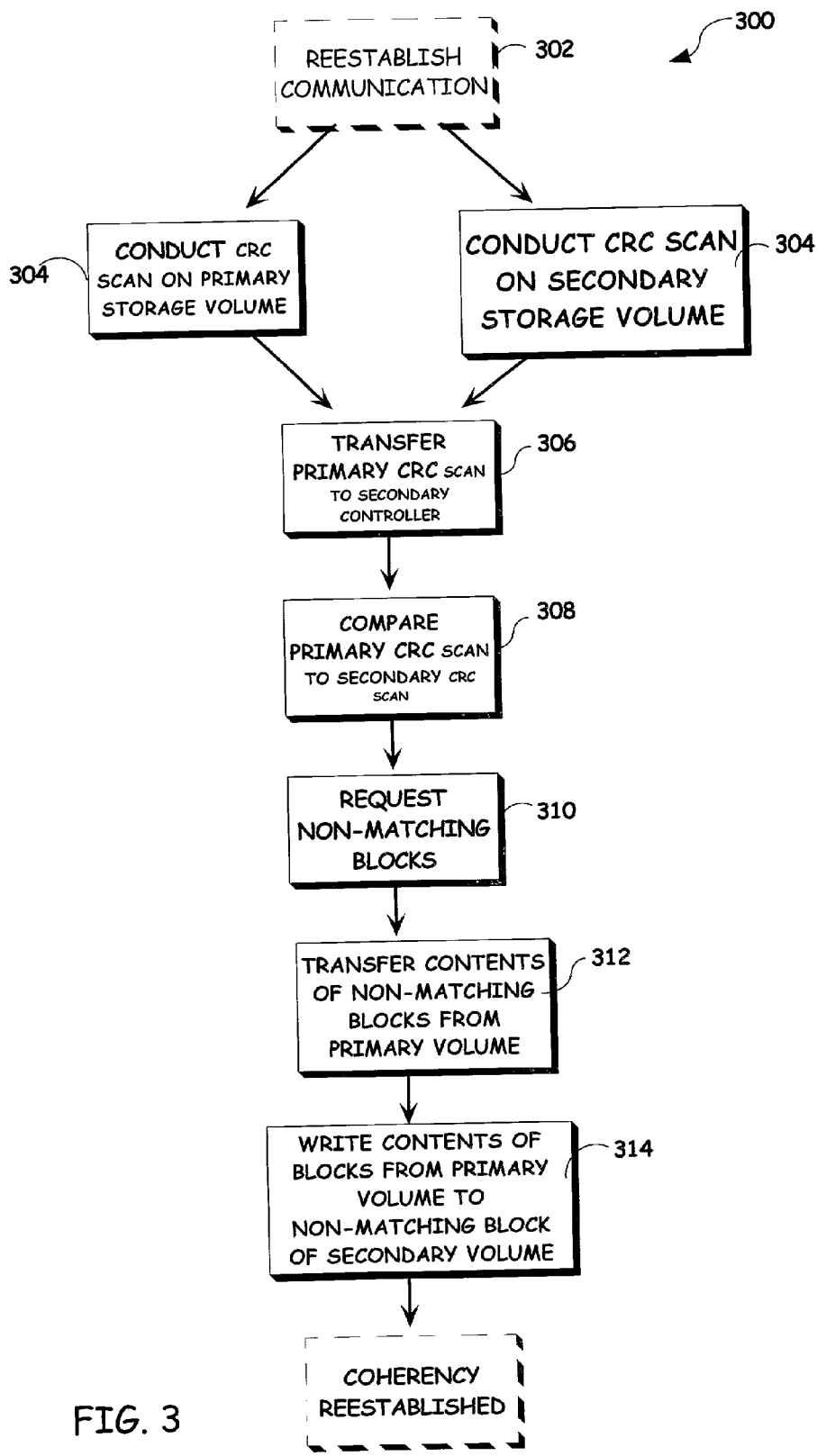
FIG. 3 is a flow chart of an exemplary embodiment of a method of restoring coherency in mirrored storage volumes.

Referring generally now to FIGS. 1 through 3, exemplary embodiments of the present invention are shown, wherein a protocol and a controller are suitable for managing the coherency of mirrored data storage volumes.

Referring now to FIG. 1 a mirrored storage volume system 100 is shown. The mirrored storage volume system 100 of the present invention offers the ability for clients to manage data in an integrated fashion without the drawbacks associated with maintaining a non-volatile bitmap during interruptions in communication. By utilizing the present invention, mirrored storage volumes may effectively manage data storage resources in a cost efficient and effective manner.

The mirrored storage system 100 may include a primary storage controller 102. The primary storage controller 102 may be linked to a primary storage volume 104 such that the primary storage controller may be capable of managing the reading and writing of data in the primary storage volume 104 as well as performing a block by block cyclic redundancy check (CRC) of the primary storage volume 104. Additionally, the primary storage controller may be capable of comparing the results of various CRC scans to determine differences between scans. For example, the primary storage controller 102 may be capable of comparing the primary storage volume CRC scan to a secondary storage volume 108 CRC scan. During utilization, the primary storage controller 102 may receive input/output operations from clients 112 as well as data transfers from a secondary storage controller 106 linked to a secondary storage volume 108 wherein the secondary storage controller is capable of managing the storage of data in the secondary storage volume 108. Upon the primary storage controller 102 allowing data to be written to the primary storage volume 104, the primary storage controller 102 may transfer the data to be written to the secondary controller 106 so that the secondary storage volume 108 mirrors the primary storage volume 104. Also, the secondary storage controller 106 may be capable of performing a block by block CRC of the secondary storage volume and comparing the secondary storage volume CRC scan with the CRC scan transferred from the primary storage controller 102.

The primary storage controller 102 may manage data transfers from the secondary storage controller 106, such that the primary storage controller 102 is allowed to issue read and write requests to the primary storage volume 104, while the secondary storage controller requests permission from the primary storage controller 102 prior to data being transferred to/from the primary storage volume 104. In the present embodiment, the primary storage controller 102 is linked to the secondary storage controller 106 via a communication channel 110.

The communication channel 110 linking the primary storage controller 102 and the secondary storage controller 106 may be suitable for bi-directional communication. For example, the communication channel 110 may link the primary storage controller 102 in one location with the secondary storage controller 106 located in a different office, geographic location such as a different city or the like.

During operation of the mirrored storage system 100, an interruption in communication may occur between the primary and secondary controller 102 & 106. As a result, an incoherency may occur between the data stored in the primary and the secondary storage volumes 104 & 108 resulting in the secondary storage volume 108 failing to mirror the contents of the primary storage volume 104.

In the current embodiment, the mirrored storage system 100, upon reestablishment of the communication channel 110 between the primary and the secondary storage controllers 102 & 106, may be capable of conducting a CRC scan of their respective primary and secondary storage volumes 104 & 108. The primary storage controller 102 may be further capable of transferring the results of the primary storage volume CRC scan to the secondary storage controller 106 for comparison with the secondary storage volume CRC scan. It is to be understood that the comparison of respective CRC scans may be conducted by the primary storage volume without departing from the spirit and scope of the present invention.

Once the secondary storage controller 106 has made a comparison of the primary and secondary CRC scans the secondary controller 106 may request the transfer of non-matching blocks of the primary storage volume 104 from the primary controller 102.

The primary storage controller 102, upon reception of the request for non-matching blocks, transfer the data from the primary storage volume 104 to the secondary storage controller 106 for writing to the secondary storage volume 108.

In another embodiment of the present invention, the system for managing mirrored storage volumes may be capable of performing CRC scans to determine the coherency of the primary and secondary storage volumes at a set time period such that coherency of the mirrored storage volumes may be ensured.

In further embodiments of the invention, additional algorithms may be utilized to generate scans for comparison to reestablish coherency. In various embodiments the mirrored storage volume system 100 may conduct at least one of a MD-5 and a SHA-1, based scans to generate a scan for comparison. A mirrored storage volume system may be capable of utilizing scans conducted on the primary and secondary storage volumes to reestablish coherency. It is the intention to include and encompass such changes without departing from the scope and spirit of the present invention.

Referring now to FIG. 2 in a further embodiment, a mirrored storage system 200 includes a primary storage controller 102 linked to a volatile memory 216 suitable for maintaining a coarse gain bit map. Maintaining a bitmap in non-volatile memory reduces the complexity and cost of mirrored storage volumes systems while including essentially a redundant CRC system protects against power surges and the like. A coarse grain bitmap may include data representing changes having occurred in a storage volume, such as the primary storage volume. It is to be understood that the granularity of the bitmap may vary depending on the amount of data, the number of write operations having occurred and the like. Upon the occurrence of an interruption in a communication channel 210 between the primary storage controller 202 and a secondary storage controller 206, the primary storage controller 202 creates a coarse grain bitmap indicating the location of changes occurring in a primary storage volume 204 linked to the primary storage controller 202. In this manner the primary storage volume 204 may continue to be written to while there is a break in communication.

Once the communication channel 210 is reestablished between the primary and secondary storage controllers 202 & 206, the primary controller 202 may utilize the coarse gain bit map to reestablish coherency in the secondary storage volume so that the data in the secondary storage volume 208 mirrors the contents of the primary storage volume 204.

Should a power failure or the like cause a loss of data in the bitmap the primary storage controller 202 reverts to a CRC scan of the primary storage volume 204, once the communication channel 210 is reestablished, and transmitting a message to the secondary storage controller 206 to initiate a CRC scan of the secondary storage volume 208. The primary and secondary CRC scans are compared by the secondary storage controller 206 and non-matching blocks requested from the primary controller 202 for writing to the secondary storage volume 208.

In reference to FIG. 3, an exemplary method for establishing coherency in mirrored storage volumes 300 is shown, wherein coherency of mirrored storage volumes is restored. Initially, upon the reestablishment of a communication channel 302 after an interruption, primary and secondary storage controllers conduct a block-by-block CRC scan of their respectively linked primary and secondary storage volumes. Conducting a CRC scan 304 includes the utilization of a algorithm to calculate a binary code as a result of arithmetic operations on the data included in a storage volume, such as the primary storage volume in the case of the primary storage controller.

After the primary and the secondary storage controllers conduct the CRC scans 304, the result of the primary CRC scan may be transferred to the secondary storage controller 306. Transferring the primary scan result 306 may include transmitting the data generated as a result of the CRC scan to the secondary controller through a communication channel such as the communication channel 110 in FIG. 1.

Once the secondary storage controller receives the result of the primary scan, the secondary controller compares the result of the secondary storage volume CRC scan result to that of the primary storage volume CRC scan result. Comparing the primary CRC scan 308 to the secondary storage volume scan may include comparing scan results for blocks of data in the primary storage volume with the corresponding CRC scan for corresponding blocks of data in the secondary storage volume.

Following the comparison of the CRC scans for the primary and secondary storage volumes 308, the secondary storage controller may request the transfer of non-matching blocks from the primary storage volume via the primary storage controller. Requesting non-matching blocks 310 includes data blocks where the secondary storage volume fails to mirror the primary storage volume.

The primary storage controller may transfer the non-matching blocks of data by initiating a reading of the primary storage volume upon the receipt of the request for the non-matching blocks 310. Transmitting non-matching blocks 312 by the primary storage controller may include initiating a reading of the non-matching blocks in the primary storage volume. The data from the non-matching blocks of the primary storage volume are transmitted to the secondary storage controller via the communication channel between the primary and secondary controller.

Upon reception of the data from the primary storage volume, the secondary controller writes the data transferred from the primary storage volume to the secondary storage volume. Writing the non-matching blocks 314 may include writing information to the secondary storage volume such that the non-matching block on the secondary volume is updated with the primary storage volume data from the corresponding block.

Furthermore, in additional embodiments the method may utilize various algorithms to restore coherency. The method for restoring coherency may employ additional algorithms such as at least one of a MD-5 and a SHA-1 scan to generate scans for comparison. It is the intention to include and encompass such changes without departing from the scope and spirit of the present invention.

Figure 4:
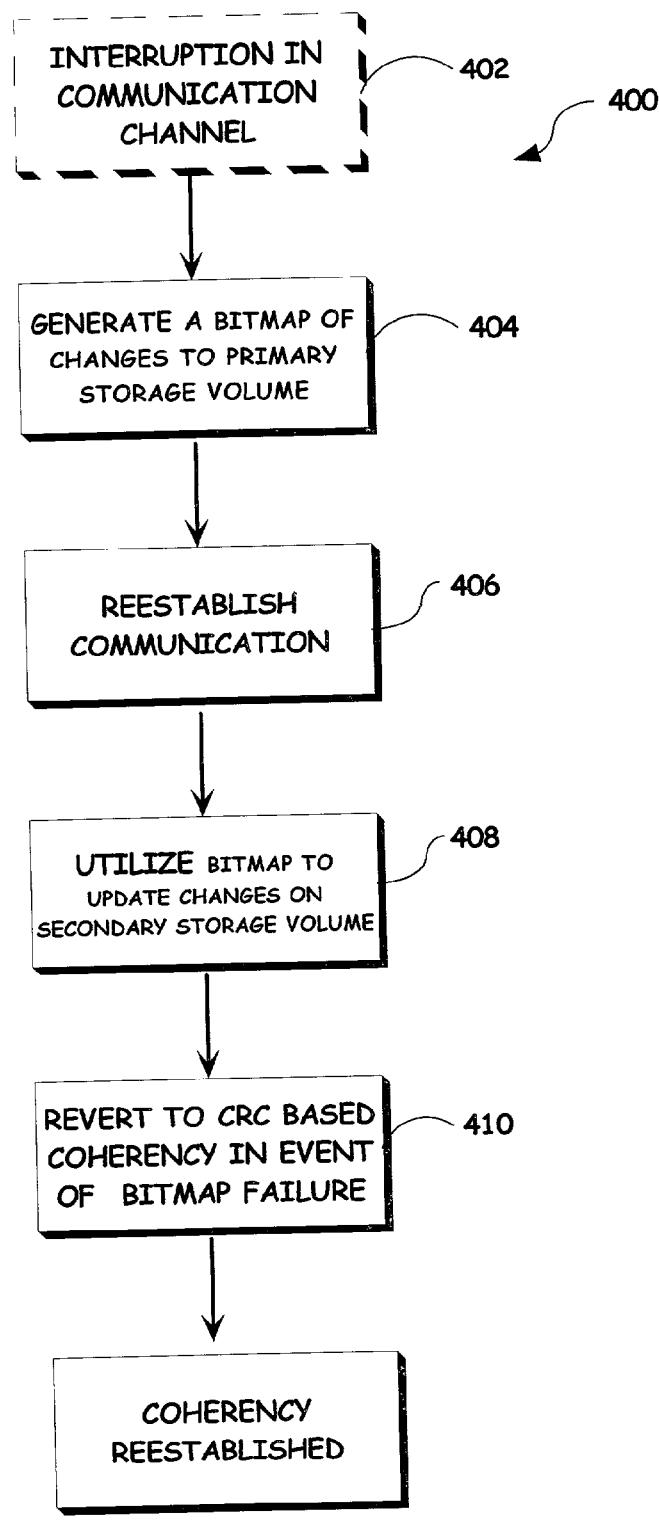
FIG. 4 is a flow chart of an exemplary method of restoring coherency in mirrored storage volumes including the utilization of a bitmap.

In a further embodiment, with reference to FIG. 4, a method of restoring coherency in mirrored storage volumes 400 may include utilizing a coarse grain bitmap maintained in a volatile memory linked to a primary storage controller. A coarse gain bitmap may include data representing changes having occurred in a storage volume, such as the primary storage volume. It is to be understood that the granularity of the bitmap may vary depending on the amount of data, the number of write operations having occurred and the like. The generation and utilization of a coarse grain bitmap stored in volatile memory may allow a mirrored storage volume system to maintain the changes without the need for maintaining the bitmap in non-volatile memory. Thus, the need for costly hardware is reduced while retaining the capability of reverting to a CRC method of establishing coherency should a power failure, reset type error or the like occur and corrupt the bitmap.

In the present embodiment, upon an interruption in communication 402 the primary storage controller may generate a coarse grain bitmap of changes in the primary storage volume. Generating a bitmap 404 may include information suitable for determining data changes having occurred while a communication channel is disrupted.

Once the communication channel between the primary storage controller and a secondary storage controller has been reestablished 406, the primary storage controller may utilize the bitmap 406 to update changes to the secondary storage volume. Should a power surge, reset type error or the like occur, the method of restoring coherency in mirrored storage volumes 400 may revert to the CRC approach method 408 for reestablishing coherency as set forth above, with specific reference to the method of restoring coherency in mirrored storage volumes 300 of FIG. 3.

Figure 5:
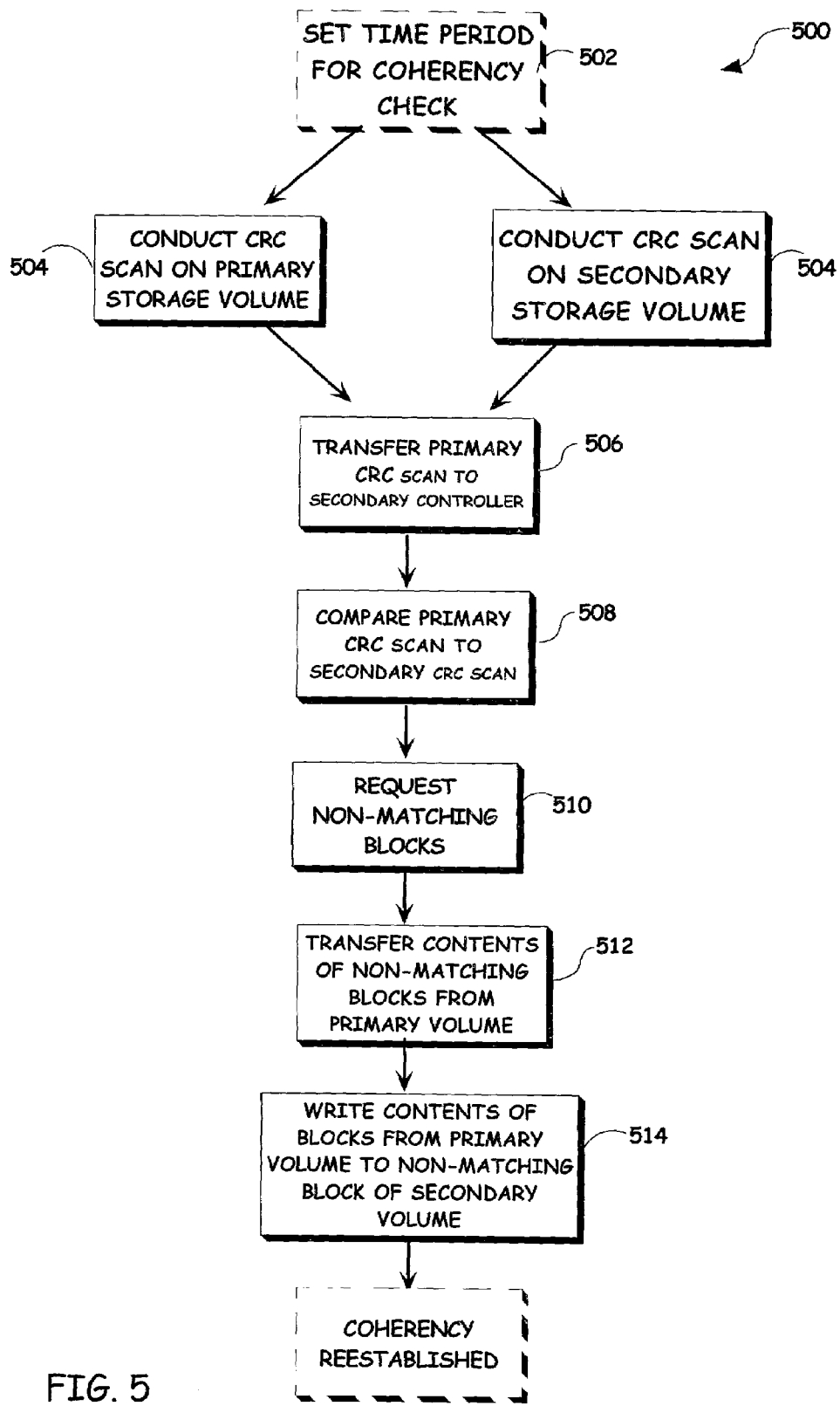
FIG. 5 is a flow chart of an exemplary method of utilizing cyclic redundancy checking to ensure the coherency of data in mirrored storage volumes.

Referring to FIG. 5, in an additional embodiment a method for managing mirrored storage volumes 500 is shown wherein the coherency of mirrored storage volumes is safeguarded against hidden corruption, due to faulty storage media or the like. Initially, at a set time period 502, a primary and a secondary storage controllers may conduct a low-priority block by block CRC scan of their respectively linked primary and secondary storage volumes. Conducting a CRC scan 504 may include the utilizing a algorithm to calculate a binary code as a result of arithmetic operations on the data included in a storage volume, such as the primary storage volume in the case of the primary storage controller.

After the primary and the secondary storage controllers conduct the CRC scans 504, the result of the primary CRC scan may be transferred to the secondary storage controller 506. Transferring the primary scan result 506 may include transmitting the data generated as a result of the CRC scan to the secondary controller through a communication channel such as the communication channel 110 in FIG. 1.

Once the secondary storage controller receives the result of the primary scan, the secondary controller compares the result of the secondary storage volume CRC scan result to that of the primary storage volume CRC scan result. For instance the primary CRC scan 508 to the secondary storage volume scan may compare scan results for blocks of data in the primary storage volume with a corresponding CRC scan for corresponding blocks of data in the secondary storage volume.

Following the comparison of the CRC scans for the primary and secondary storage volumes 508, the secondary storage controller may request the transfer of non-matching blocks from the primary storage volume via the primary storage controller. Requesting non-matching blocks 510 includes data blocks where the secondary storage volume fails to mirror the primary storage volume.

The primary storage controller may transfer the non-matching blocks of data by initiating a reading of the primary storage volume upon the receipt of the request for the non-matching blocks 510. Transmitting non-matching blocks 512 by the primary storage controller may include initiating a reading of the non-matching blocks in the primary storage volume and transmitting the data from the non-matching blocks of the primary storage volume to the secondary storage controller via the communication channel between the primary and secondary controller.

Furthermore, upon the reception of the data from the primary storage volume the secondary controller may write the data transferred from the primary storage volume to the secondary storage volume. Writing the non-matching blocks 514 may include writing information to the secondary storage volume such that the non-matching block on the secondary volume may be updated with the primary storage volume data from the corresponding block.

Furthermore, in additional embodiments the method may utilize various algorithms to restore coherency. The method for restoring coherency may employ additional algorithms such as at least one of a MD-5 and a SHA-1 to generate scans for comparison. It is the intention to include and encompass such changes without departing from the scope and spirit of the present invention.

It is believed that the Cyclic Redundancy Checking For Managing The Coherency Of Mirrored Storage Volumes of the present invention and many of its attendant advantages will be understood by the forgoing description. It is also believed that it will be apparent that various changes may be made in the form, construction and arrangement of the components/steps thereof without departing from the scope and spirit of the invention or without sacrificing all of its material advantages. The form herein before described being merely an explanatory embodiment thereof. It is the intention of the following claims to encompass and include such changes.

What is claimed is:

1. A mirrored storage volume system, capable of incoherency correction, comprising:
   a primary storage controller capable of managing data, wherein the primary storage controller is capable of cyclic redundancy checking stored data;
   a primary storage volume suitable for storing data, wherein the primary storage volume is linked to the primary controller such that, the primary storage controller is capable of cyclic redundancy checking data stored on the primary storage volume;
   a secondary storage controller capable of accepting transferred data from the primary storage controller, wherein the secondary controller is capable of cyclic redundancy checking stored data;
   a secondary storage volume linked to the secondary storage controller wherein the secondary storage volume is capable of storing data mirroring the primary storage volume; and
   a communication channel linking the primary controller to the secondary controller wherein the communication channel is suitable for communicating data transfers, the secondary storage controller initiates a cyclic redundancy check of the secondary storage volume upon reestablishment after an interruption in the communication channel, the secondary storage controller compares a primary cyclic redundancy check scan with a secondary cyclic redundancy check scan and requests non-matching data blocks.

2. The mirrored storage volume system of claim 1, wherein the primary storage controller initiates a cyclic redundancy check of the primary storage volume upon reestablishment after an interruption in the communication channel.

3. The mirrored storage volume of claim 2, wherein the primary controller is capable of comparing the primary cyclic redundancy check scan with a secondary storage volume cyclic redundancy check scan.

4. The mirrored storage volume system as claimed in claim 1, wherein the primary storage controller initiates the primary cyclic redundancy check scan at a set time period.

5. The mirrored storage volume system as claimed in claim 4, wherein the primary cyclic redundancy check scan is a low priority operation.

6. The mirrored storage volume system of claim 1, wherein the primary storage controller is capable of directing the primary storage volume to read and write data.

7. The mirrored storage volume system of claim 1, wherein the secondary storage volume is geographically remote from the primary storage volume.

8. The mirrored storage volume system of claim 1, further comprising a volatile memory linked to the primary storage controller, wherein the volatile memory is configured to maintain a coarse grain bit map if the communication channel is interrupted.

9. The mirrored storage volume of claim 8, wherein the coarse grain bitmap contains data representing changes to the primary storage volume.

10. A mirrored storage volume system, capable of incoherency correction, comprising:
    a primary storage controller capable of managing data, wherein the primary storage controller is capable of at least one of a MD-5 and a SHA-1 scan of stored data;
    a primary storage volume suitable for storing data, wherein the primary storage volume is linked to the primary controller such that, the primary storage controller is capable of conducting at least one of a MD-5 and a SHA-1 scan on data stored on the primary storage volume;
    a secondary storage controller capable of accepting transferred data from the primary storage controller, wherein the secondary controller is capable of at least one of a MD-5 and a SHA-1 scan of stored data;

a secondary storage volume linked to the secondary storage controller wherein the secondary storage volume is capable of storing data mirroring the primary storage volume; and a communication channel linking the primary controller to the secondary controller wherein the communication channel is suitable for communicating data transfers, the primary storage controller initiates the primary scan at a set time period, the primary scan being a low priority operation.

11. The mirrored storage volume system of claim 10, wherein the primary storage controller initiates of at least one of a MD-5 and a SHA-1 scan of the primary storage volume upon reestablishment after an interruption in the communication channel.

12. The mirrored storage volume of claim 11, wherein the primary controller is capable of comparing the primary scan with a secondary storage volume scan.

13. The mirrored storage volume system of claim 10, wherein the secondary storage controller initiates at least one of a MD-5 and a SHA-1 scan of the secondary storage volume upon reestablishment after an interruption in the communication channel.

14. The mirrored storage volume system of claim 13, wherein the secondary storage controller compares the primary scan with the secondary scan and requests non-matching data blocks.

15. The mirrored storage volume system of claim 10, wherein the primary storage controller is capable of directing the primary storage volume to read and write data.

16. The mirrored storage volume system of claim 10, wherein the secondary storage volume is geographically remote from the primary storage volume.

17. The mirrored storage volume system of claim 10, further comprising a volatile memory linked to the primary storage controller, wherein the volatile memory is suitable for maintaining a coarse grain bit map.

18. The mirrored storage volume of claim 17, wherein the volatile memory is capable of maintaining the coarse grain bitmap if the communication channel is interrupted.

19. The mirrored storage volume of claim 17, wherein the coarse grain bitmap contains data representing changes to the primary storage volume.

20. A mirrored storage volume system, capable of incoherency correction, comprising:
 a primary storage controller capable of managing data, wherein the primary storage controller is capable of cyclic redundancy checking stored data;
 a primary storage volume suitable for storing data, wherein the primary storage volume is linked to the primary controller such that, the primary storage controller is capable of cyclic redundancy checking data stored on the primary storage volume;
 a secondary storage controller capable of accepting transferred data from the primary storage controller, wherein the secondary controller is capable of cyclic redundancy checking stored data;
 a secondary storage volume linked to the secondary storage controller wherein the secondary storage volume is capable of storing data mirroring the primary storage volume; and
 a communication channel linking the primary controller to the secondary controller wherein the communication channel is suitable for communicating data transfers, the primary storage controller initiates a primary cyclic redundancy check scan at a set time period, the primary cyclic redundancy check scan being a low priority operation.

21. The mirrored storage volume system of claim 20, wherein the primary storage controller initiates a cyclic redundancy check of the primary storage volume upon reestablishment after an interruption in the communication channel.

22. The mirrored storage volume of claim 21, wherein the primary controller is capable of comparing the primary cyclic redundancy check scan with a secondary storage volume cyclic redundancy check scan.

23. The mirrored storage volume system of claim 20, wherein the secondary storage controller initiates a cyclic redundancy check of the secondary storage volume upon reestablishment after an interruption in the communication channel.

24. A mirrored storage volume system, capable of incoherency correction, comprising:
 a primary storage controller capable of managing data, wherein the primary storage controller is capable of at least one of a MD-5 and a SHA-1 scan of stored data;
 a primary storage volume suitable for storing data, wherein the primary storage volume is linked to the primary controller such that, the primary storage controller is capable of conducting at least one of a MD-5 and a SHA-1 scan on data stored on the primary storage volume;
 a secondary storage controller capable of accepting transferred data from the primary storage controller, wherein the secondary controller is capable of at least one of a MD-5 and a SHA-1 scan of stored data;
 a secondary storage volume linked to the secondary storage controller wherein the secondary storage volume is capable of storing data mirroring the primary storage volume; and
 a communication channel linking the primary controller to the secondary controller wherein the communication channel is suitable for communicating data transfers, the secondary storage controller initiates at least one of a MD-5 and a SHA-1 scan of the secondary storage volume upon reestablishment after an interruption in the communication channel, the secondary storage controller compares the primary scan with the secondary scan and requests non-matching data blocks.

25. The mirrored storage volume system of claim 24, wherein the primary storage controller is capable of directing the primary storage volume to read and write data.

26. The mirrored storage volume system of claim 24, wherein the secondary storage volume is geographically remote from the primary storage volume.

27. The mirrored storage volume system of claim 24, further comprising a volatile memory linked to the primary storage controller, wherein the volatile memory is suitable for maintaining a coarse grain bit map.

28. The mirrored storage volume of claim 27, wherein the volatile memory is capable of maintaining the coarse grain bitmap if the communication channel is interrupted.

29. The mirrored storage volume of claim 27, wherein the coarse grain bitmap contains data representing changes to the primary storage volume.

* * * * *